United States Patent [19]

Porter

[11] Patent Number: 5,720,382

[45] Date of Patent: Feb. 24, 1998

[54] MODULE COVER

[76] Inventor: Kenneth L. Porter, 4623 Hillsdale, Olive Branch, Miss. 38654

[21] Appl. No.: 650,152

[22] Filed: Jan. 19, 1996

Related U.S. Application Data

[63] Continuation-in-part of Ser. No. 298,770, Aug. 31, 1994, Pat. No. 5,511,655, which is a continuation-in-part of Ser. No. 846,604, Mar. 5, 1992, Pat. No. 5,386,905.

[51] Int. Cl.[6] .................................................. B65D 71/00
[52] U.S. Cl. .............................. 206/83.5; 52/3; 150/154
[58] Field of Search .......................... 52/3–5; 206/83.5, 206/442, 597; 150/154

[56] References Cited

U.S. PATENT DOCUMENTS

| | | |
|---|---|---|
| 3,749,003 | 7/1973 | Wilkes et al. . |
| 3,941,047 | 3/1976 | Orlando et al. . |
| 4,071,138 | 1/1978 | Wright . |
| 4,184,425 | 1/1980 | Haney et al. . |
| 4,538,385 | 9/1985 | Kandarian . |
| 4,869,363 | 9/1989 | Goldberg . |

*Primary Examiner*—Jimmy G. Foster

*Attorney, Agent, or Firm*—Walker, McKenzie & Walker, P.C.

[57] ABSTRACT

In combination, a self-supporting module of fibrous material and a cover. The cover includes a cap with a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module; first strap structure secured to the cap at a point slightly below the top member of the cap and extending completely around the module lengthwise and parallel to the top of the module; and a second strap structure secured to the cap at a point below the first strap structure and extending completely around the module lengthwise and parallel to the top of the module.

3 Claims, 9 Drawing Sheets

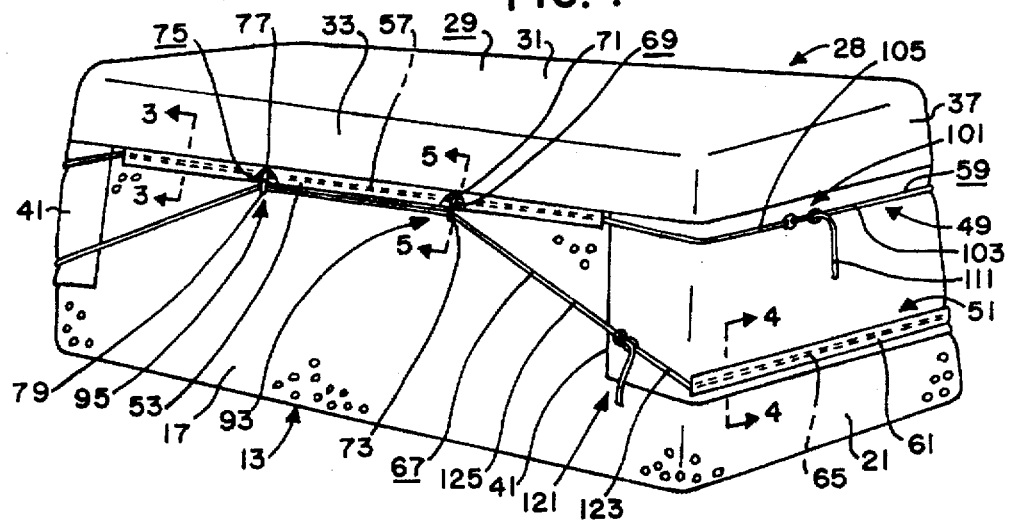
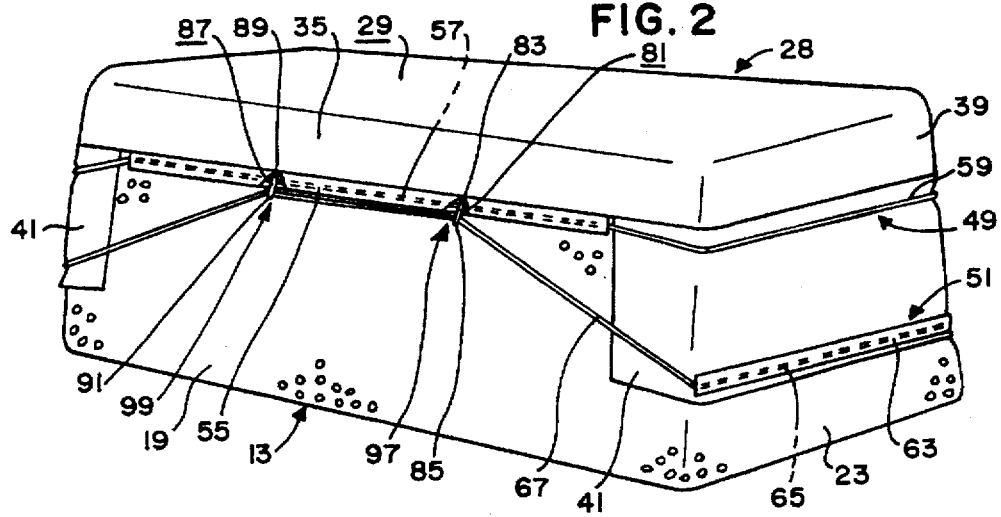
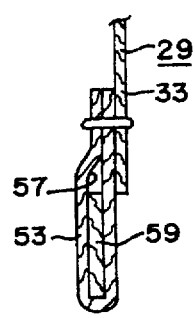
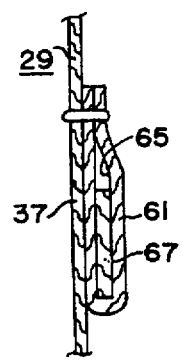
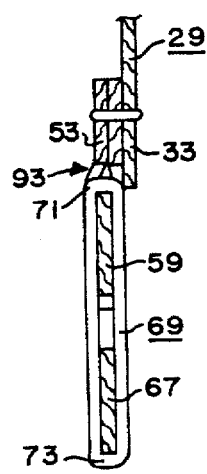

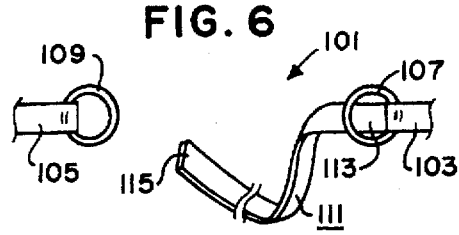
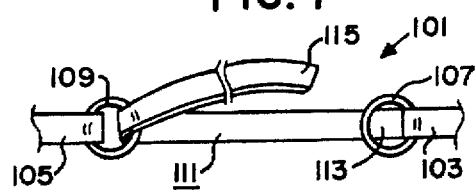
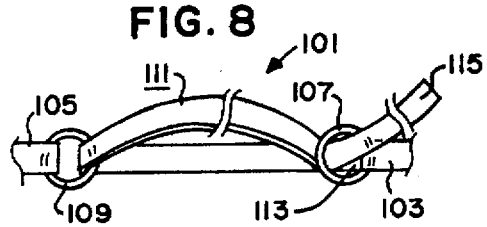
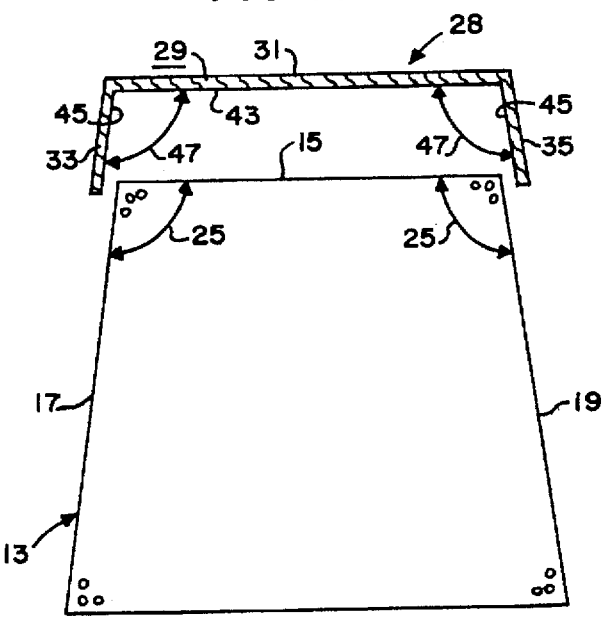
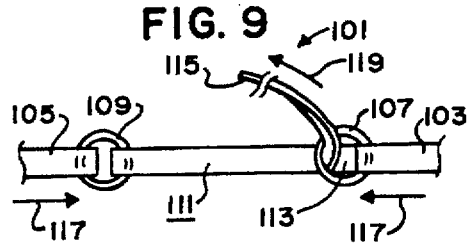
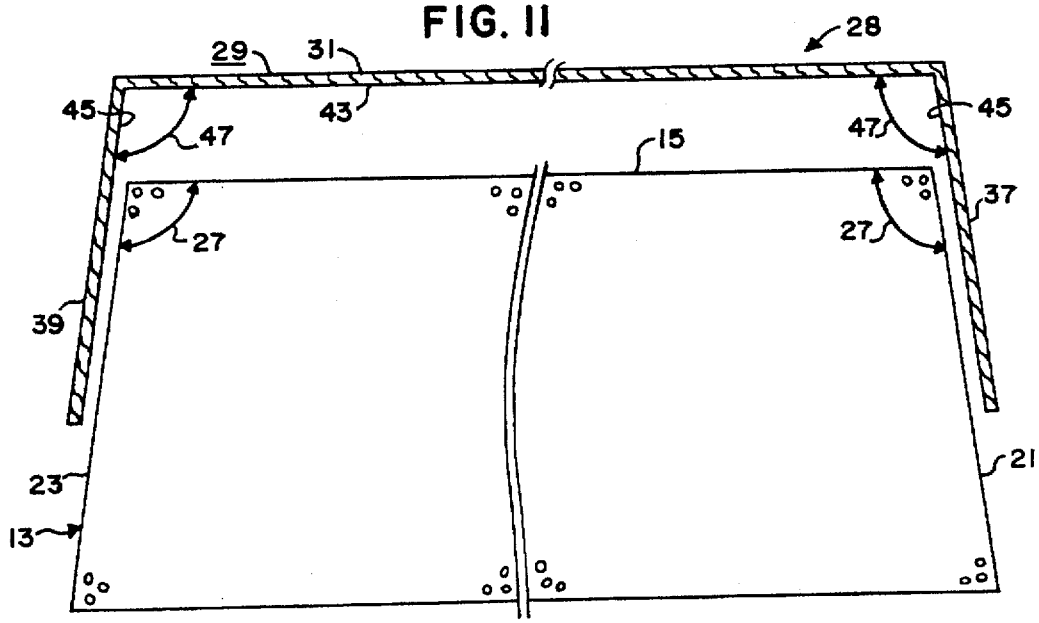

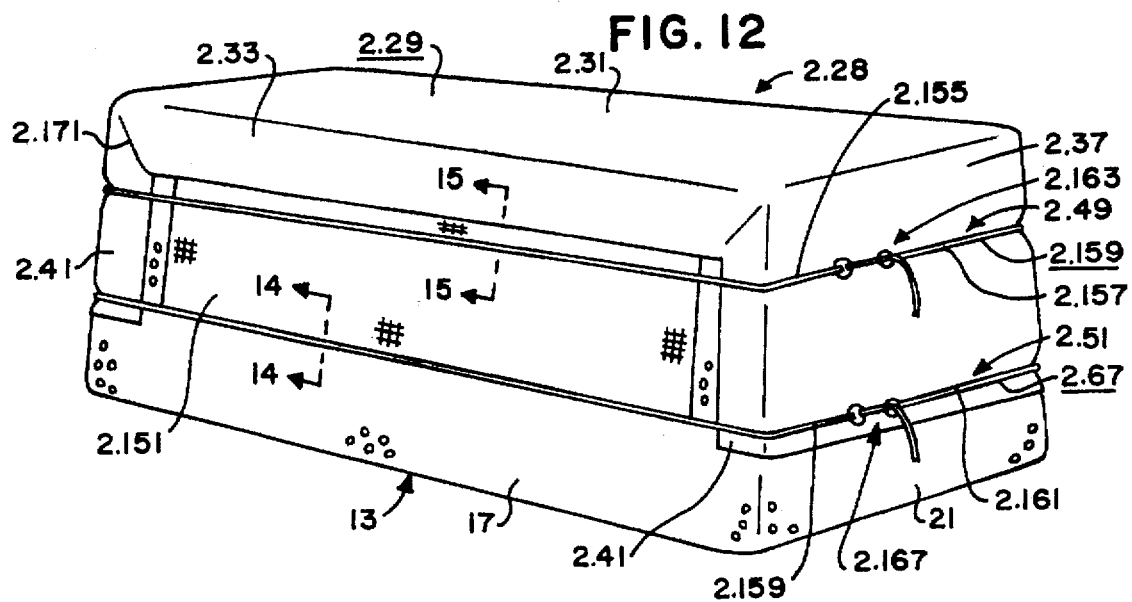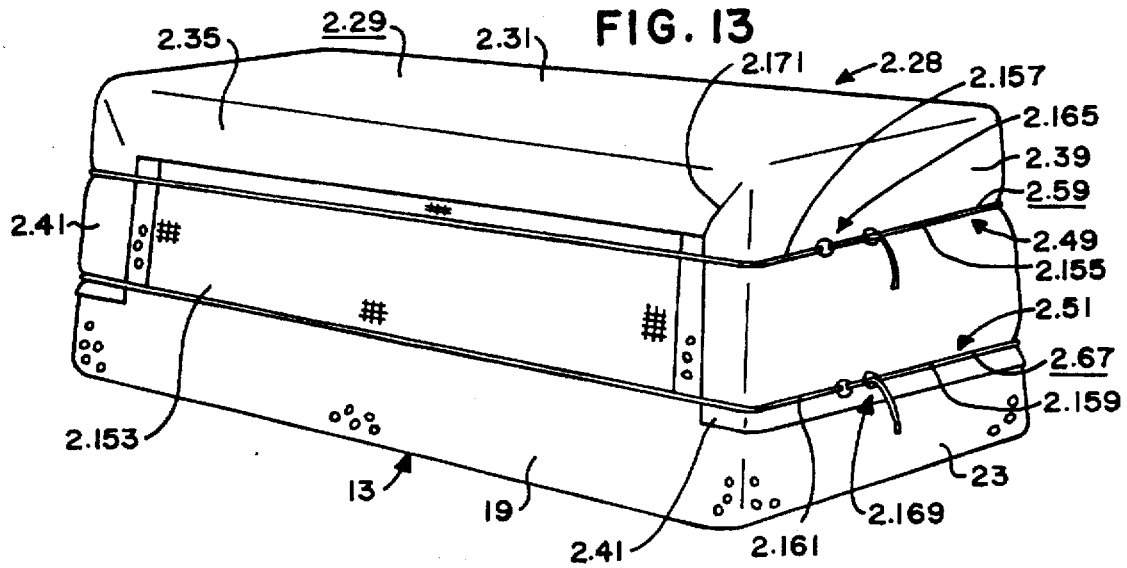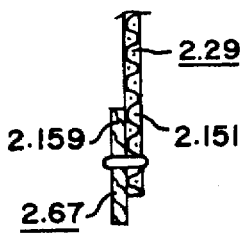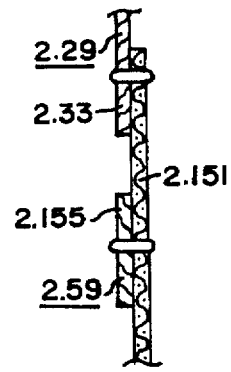

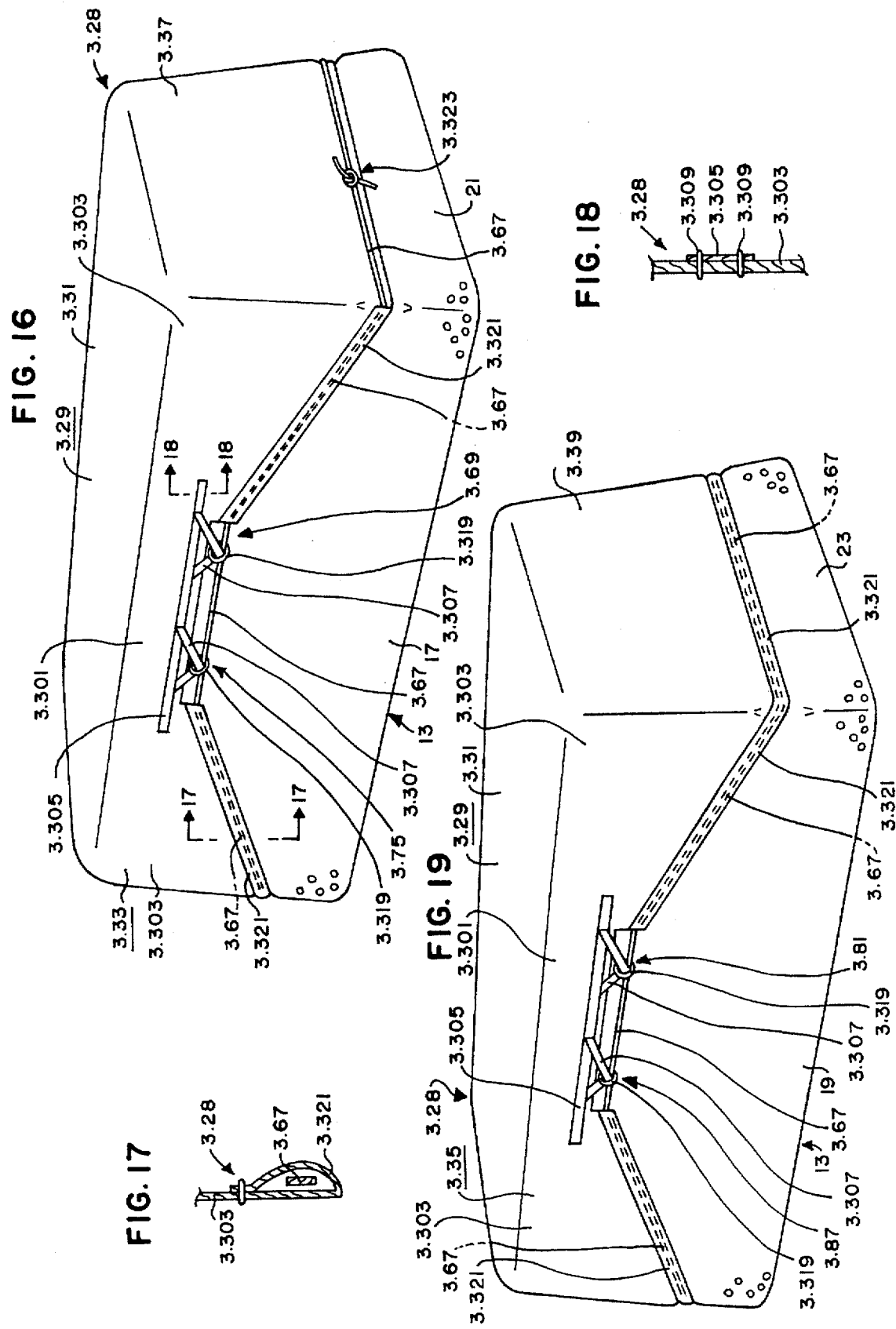

MODULE COVER

CROSS-REFERENCE TO RELATED APPLICATION

This is a continuation-in-part of application Ser. No. 08/298,770, entitled "MODULE COVER," filed Aug. 31, 1994, U.S. Pat No. 5,511,655, which is a continuation-in-part of application Ser. No. 07/846,604, entitled "COTTON MODULE COVER," filed Mar. 5, 1992, now U.S. Pat. No. 5,386,905.

BACKGROUND OF THE INVENTION

1. Field of the Invention

The present invention relates, in general, to covers for covering the top of compressed, self-supporting collections of fibrous material such as cotton modules.

2. Information Disclosure Statement

Cotton is machined harvested using stripper harvesters having rollers or mechanical fingers that remove the entire cotton bole from the plant, or using spindle pickers that pull seed cotton from open cotton bolls, using revolving barbed spindles that entwine the cotton fiber and release it once separated from the boll. After being harvested, seed cotton is removed from the harvester and either stored or loaded into trailers for transport to a cotton gin for further processing.

Cotton module builders as disclosed in Wilkes et al., U.S. Pat. No. 3,749,003, issued Jul. 31, 1973, and Orlando et al., U.S. Pat. No. 3,941,047, issued Mar. 2, 1976, allow seed cotton to be formed into large, self-supporting seed cotton modules for storage directly in the cotton fields. Such cotton module builders typically include a rectangular body with a module forming chamber that is open at the top and bottom and provided with a movable rear gate, and retractable wheels so that it can be pulled onto a cotton field to allow harvested seed cotton to be dumped directly from a harvester into the open body of the module builder. The module builder includes a carriage mounted on top of the body for movement between the opposite ends of the body. The carriage has vertically reciprocable tamper so that the seed cotton dumped into the body can be continuously compressed into a firm, self-supporting module within the confines of the open body. Thus, the seed cotton is compressed in the forming chamber and will maintain the configuration and shape of the forming chamber after the compression is released and the cotton module builder moved away. While the shape and size of such cotton modules may vary, they typically have a substantially rectangular base about 32 feet (9.7 meters) long and 7 feet (2.1 meters) wide, with a height of about 7.5 feet (2.25 meters) and normally weigh more than 5,000 pounds (2,268 kilograms). The sides and ends of most cotton modules slope slightly inwardly to give cotton modules a slight trapezoid shape. When the cotton module is completed, the rear gate of the cotton builder is opened and the wheels of the cotton builder are lowered to allow the cotton builder to be pulled forwardly to a new location, leaving a tightly compacted, self-supporting seed cotton module on the field for temporary field storage. Being self-supporting, such seed cotton modules do not require any outside aid in the form of belts, straps, etc., to maintain proper shape and form.

Because a self-supporting cotton module may be left in the field for many weeks before it is picked up and transported to a cotton gin, it is usually desirable to cover the cotton module with waterproof or water-resistant fabric or the like to at least partially protect the cotton module from the wind and rain, etc. Flat, waterproof tarpaulins have been used in the past to cover and protect cotton modules. Such tarpaulins are typically secured to the cotton modules with spikes, ropes, weights, or the like. Kandarian, U.S. Pat. No. 4,538,385, issued Sep. 3, 1985, discloses a protective cover for a cotton module comprising a water repellent cap portion adapted to fit about the top of the module, an air permeable skirt portion connected to and depending from the cap portion and adapted to encircle the midportion of the module; and a single belt fastened about the perimeter of the skirt portion for securing the cover about the module without intrusion into the module surface, the belt having D-rings on one end and a tongue on the other end to allow the belt to be cinched about the module. Goldberg, U.S. Pat. No. 4,869,363, issued Sep. 26, 1989, discloses a combination cotton module cover and catenary hold down comprising a horizontal waterproof top sheet for covering the top of the cotton module; flexible side wall sheets secured to the top sheet to partially overlay the side walls of the module, the side wall sheets having a generally horizontal bottom edge; at least three loops secured to the bottom edge of each side wall and extending downwardly from the bottom edge of each side wall with at least one loop located near the center of each side wall being shorter than the other loops; and a cord passing through the loops and about the cotton module to secure the cover to the module, the cord coacting with the loops to form a catenary curve along the side walls of the cotton module.

From the fields, seed cotton is eventually moved to cotton gins for separation of lint and seed. At the cotton gin, the seed cotton first goes through cleaning equipment to remove trash and other foreign matter, and is then conveyed to gin stands where revolving circular saws pull the lint through closely spaced ribs that prevent the seed from passing through. The cotton lint is removed from the saw teeth by air blasts or rotating brushes, and then compressed between the platens of a cotton press into a cotton bale weighing approximately 500 pounds (227 kilograms). Since such cotton bales are not self-supporting, a plurality of cotton bale ties in the form of metal bands are tightly wrapped around the compressed cotton bales while the cotton bales remain compressed between the platens of the cotton press. The platens typically have grooves in the faces thereof for receiving the cotton bale ties before the cotton lint is placed therebetween. See Wright, U.S. Pat. No. 4,071,138, issued Jan. 31, 1978. After the cotton bale ties are secured, the platens are opened and the tied cotton bales removed for transport to a textile mill or the like. Covers may be applied to the cotton bales to keep the cotton bales clean. The covers may consist of bag-like structure for placing over tied cotton bales, or may consist merely of sheets of cloth or the like placed over the face of the platens before the cotton lint is placed therebetween so that the sheets will be positioned between the cotton bale ties and opposite faces of the cotton bale, etc.

Nothing in the above prior art discloses or suggests the present invention. For example, nothing in the above prior art discloses or suggests the combination of a compressed self-supporting module of fibrous material and a cover comprising a cap with a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module; first strap means secured to the cap at a point slightly below the top member of the cap and extending completely around the module lengthwise and parallel to the top of the module; and a second strap means secured to the cap at a point below the first strap means and extending completely around the module lengthwise and parallel to the top of the module.

SUMMARY OF THE INVENTION

The present invention is directed toward providing an improved cover for combination with a compressed self-supporting module of fibrous material.

The cover of the present invention includes a cap with a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module; first strap means secured to the cap at a point slightly below the top member of the cap and extending completely around the module lengthwise and parallel to the top of the module; and a second strap means secured to the cap at a point below the first strap means and extending completely around the module lengthwise and parallel to the top of the module.

BRIEF DESCRIPTION OF THE DRAWINGS

FIG. 1 is a perspective view of a first embodiment of the module cover of the present invention.

FIG. 2 is a perspective view similar to FIG. 1 but showing the first embodiment of the module cover of the present invention from the opposite end.

FIG. 3 is a sectional view substantially as taken on line 3—3 of FIG. 1 on an enlarged scale and with certain portions omitted for clarity.

FIG. 4 is a sectional view substantially as taken on line 4—4 of FIG. 1 on an enlarged scale and with certain portions omitted for clarity.

FIG. 5 is a sectional view substantially as taken on line 5—5 of FIG. 1 on an enlarged scale and with certain portions omitted for clarity.

FIG. 6 is a somewhat diagrammatic view of the preferred embodiment of the binding strap securing means of the module cover of FIG. 1 shown in a completely opened position.

FIGS. 7 and 8 are similar to FIG. 6 but show the binding strap securing means thereof in partially secured positions.

FIG. 9 is similar to FIGS. 6, 7 and 8 but shows the binding strap securing means in a fully secured position.

FIG. 10 is a somewhat diagrammatic transverse cross section of the module cover of FIG. 1 with portions thereof omitted and broken away for clarity, and positioned above a module.

FIG. 11 is a somewhat diagrammatic longitudinal cross section of the module cover of FIG. 1 with portions thereof omitted and broken away for clarity, and positioned above a module.

FIG. 12 is a perspective view of a second embodiment of the module cover of the present invention.

FIG. 13 is a perspective view similar to FIG. 12 but showing the second embodiment of the module cover of the present invention from the opposite end.

FIG. 14 is a sectional view substantially as taken on line 14—14 of FIG. 12 on an enlarged scale and with certain portions omitted for clarity.

FIG. 15 is a sectional view substantially as taken on line 15—15 of FIG. 12 on an enlarged scale and with certain portions omitted for clarity.

FIG. 16 is a perspective view of a third embodiment of the module cover of the present invention.

FIG. 17 is a sectional view substantially as taken on line 17—17 of FIG. 16 on an enlarged scale and with portions omitted for clarity.

FIG. 18 is a sectional view substantially as taken on line 18—18 of FIG. 16 on an enlarged scale and with portions omitted for clarity.

FIG. 19 is a perspective view similar to FIG. 16 but showing the third embodiment of the module cover of the present invention from the opposite side.

DESCRIPTION OF THE PREFERRED EMBODIMENTS

Figure 20:
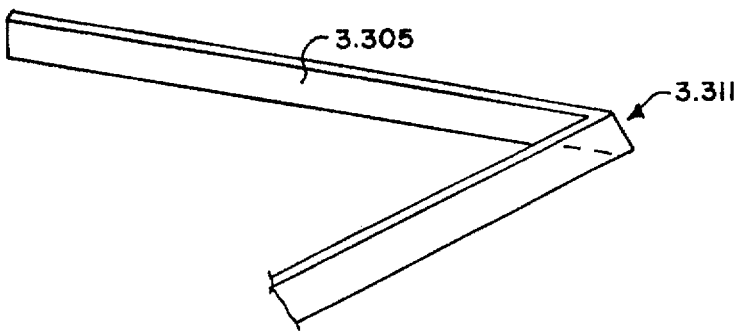
FIG. 20 is a somewhat diagrammatic perspective view of an upper strap of the third embodiment of the module cover of the present invention showing a first fold of a first hanger member thereof.

The module cover of the present invention is for use with a self-supporting module 13 of compressed fibrous material such as a typical cotton module to protect at least a portion of the module 13 from wind, rain, etc.

A typical self-supporting module 13 has a top 15, a first side wall 17, a second side wall 19, a first end wall 21, and a second end wall 23 (see, in general, FIGS. 10 and 11). Such a module 13 is preferably constructed by use of a typical cotton module builder or the like such as the self-propelled module builder disclosed by Haney et al., U.S. Pat. No. 4,184,425, issued Jan. 22, 1980. While such cotton modules 13 may be various shapes and sizes, a typical module 13 is substantially block-like and has a rectangular base about 32 feet (9.7 meters) long and 7 feet (2.1 meters) wide, with a height of about 7.5 feet (2.25 meters). The inside angle between the top 15 and side walls 17, 19 of such typical modules 13 is commonly greater than 90 degrees as indicated by the arrows 25 in FIG. 10 whereby the module 13 has a trapezoid when viewed from either end. Likewise, the inside angle between the top and end walls 21, 23 of such typical cotton modules is commonly greater than 90 degrees as indicated by the arrows 27 in FIG. 11 whereby the module 13 also has a trapezoid shape when viewed from either side.

A first preferred embodiment module cover of the present invention is shown in FIGS. 1–11 and identified by the numeral 28. The cover 28 is for use with a typical module 13 to protect at least a portion of the module 13 from wind, rain, etc.

The cover 28 includes a cap 29 for covering the top 15 of the module 13. The cap 29 preferably includes a top member 31 for covering the top 15 of the module 13, a first side wall member 33 attached to the top member 31 and depending downwardly from the top member 31 for covering at least a portion of the first side wall 17 of the module 13, a second side wall member 35 attached to the top member 31 and depending downwardly from the top member 31 for covering at least a portion of the second side wall 19 of the module 13, a first end wall member 37 attached to the top member 31 and depending downwardly from the top member 31 for covering at least a portion of the first end wall 21 of the module 13, and a second end wall member 39 attached to the top member 31 and depending downwardly from the top member 31 for covering at least a portion of the second end wall 23 of the module 13. Each side wall member 33, 35 is preferably of a length to extend down from the top 15 of the module 13 a distance of approximately one fifth or so of the height of the respective side wall 17, 19 of the module 13 when the cap 29 is positioned on a module 13. Each end wall member 37, 39 is preferably of a length to extend down from the top 15 of the module 13 a distance of approximately four fifths or so of the height of the module 13 when the cap 29 is positioned on a module 13. Flaps 41 may be attached to the side edges of each end wall member 37, 39 for extending from the side edges of each end wall member 37, 39 a short distance around each corner of the module 13 as clearly shown in FIGS. 1 and 2. The cap 29 may be constructed out of a waterproof or water-repellent sheet of canvas, plastic or the like in various sizes and in various manners as will now be apparent to those skilled in the art. Thus, the cap 29 may be cut, folded and sewn from one or more flat sheets of water-repellent fabric or material as will now be apparent to those skilled in the art. Alternatively, the side wall members 33, 35 and end wall members 37, 39 can be manufactured from non-coated, non-water-repellant fabric or material.

Since a typical module 13 has a trapezoid shape when viewed from either end or side, the cap 29 is preferably constructed so that the angle between the bottom surface 43 of the top member 31 and the inside surfaces 45 of at least the upper portion of the wall members 33, 35, 37, 39 is greater than 90 degrees as indicated by the arrows 47 in FIGS. 10 and 11 whereby the cap 29 can be sized to substantially perfectly fit over the top 15 of the module 13 to eliminate any void space between the cap 29 and the module 13.

The cover 28 includes securing means for securing the cap 29 to the module 13. The securing means preferably includes an upper securing means 49 for securing the cap 29 to the module 13 at a point slightly below the top 15 of the module 13, and a lower securing means 51 for securing the cap 29 to the module 13 at a spaced distance below the upper securing means 49. The upper securing means 49 is preferably attached to at least one of the wall members 33, 35, 37, 39 at a point slightly below the top member 31. Likewise, the lower securing means 51 is preferably attached to at least one of the wall members 33, 35, 37, 39 at a spaced distance below the upper securing means 49.

The cover 28 preferably includes an upper channel means on at least one of the wall members 33, 35, 37, 39 at a point slightly below the top member 31 for receiving a portion of the upper securing means 49. The upper channel means preferably includes a first upper channel member 53 on the first side wall member 33 at a point slightly below the top member 31, and a second upper channel member 55 on the second side wall member 35 at a point slightly below the top member 31. Each first and second upper channel members 53, 55 preferably has a passageway 57 therethrough for receiving a portion of the upper securing means 49. More specifically, the upper securing means 49 preferably includes an elongated strap means 59 for extending through the passageways 57 in the first and second upper channel members 53, 55 and around the first and second end wall members 37, 39 to encircle a module 13 at a point slightly below the top 15 of the module 13 as will now be apparent to those skilled in the art. Each upper channel member 53, 55 may consist of a tube-like member constructed of an elongated length of fabric, folded lengthwise and sewn or otherwise fixedly attached to the cap 29 as will now be apparent to those skilled in the art. Alternatively, the strap means 59 may be sewn or otherwise directly attached to portions of the cap 29, may be loose relative to both the first and second end wall members 37, 39, and may be secured by knots, buckles or the like adjacent each end wall member 37, 39, etc. The elongated strap means 59 may consist of an elongated length of material such as fabric webbing, flat rope, or the like as will now be apparent to those skilled in the art.

The cover 28 preferably includes a lower channel means on at least one of the wall members 33, 35, 37, 39 at a spaced distance below the upper channel means for receiving a portion of the lower securing means 51. The lower channel means preferably includes a first lower channel member 61 on the first end wall member 37 a spaced distance below the upper securing means 49, and a second lower channel member 63 on the second end wall member 39 a spaced distance below the upper securing means 49. Each first and second lower channel members 61, 63 preferably has a passageway 65 therethrough for receiving a portion of the lower securing means 51. More specifically, the lower securing means 51 preferably includes an elongated strap means 67 for extending through the passageways 65 in the first and second lower channel members 61, 63 and around the first and second end wall members 37, 39 to encircle a module 13 a spaced distance below the strap means 59 of the upper securing means 51 as will now be apparent to those skilled in the art. Each lower channel member 61, 63 may consist of a tube-like member constructed of an elongated length of fabric, folded lengthwise and sewn or otherwise fixedly attached to the cap 29 as will now be apparent to those skilled in the art. Alternatively, the strap means 67 may be sewn or otherwise directly attached to portions of the cap 29, may be loose relative to both the first and second end wall members 37, 39, and may be secured by knots, buckles or the like adjacent each end wall member 37, 39, etc. The elongated strap means 67 may consist of an elongated length of material such as fabric webbing, flat rope, or the like as will now be apparent to those skilled in the art.

The cover 28 preferably includes hanger means for hanging the elongated strap means 67 of the lower securing means 51 from the elongated strap means 59 of the upper securing means 49. The hanger means preferably includes plurality of hanger members with each hanger member having an upper end for being coupled to the elongated strap means 59 of the upper securing means 49 and having a lower end for being coupled to the elongated strap means 67 of the lower securing means 51. More specifically, the hanger means preferably includes a first hanger member 69 having an upper end 71 coupled to the elongated strap means 59 of the upper securing means 49 at a point along the first side wall 17 of a module 13 between the first end wall 21 of the module 13 and the center of the first side wall 17 of the module 13, and having a lower end 73 coupled to the elongated strap means 67 of the lower securing means 51; a second hanger member 75 having an upper end 77 coupled to the elongated strap means 59 of the upper securing means 49 at a point along the first side wall 17 of the module 13 between the second end wall 23 of the module 13 and the center of the first side wall 17 of the module 13 and having a lower end 79 coupled to the elongated strap means 67 of the lower securing means 51; a third hanger member 81 having an upper end 83 coupled to the elongated strap means 59 of the upper securing means 49 at a point along the second side wall 19 of a module 13 between the first end wall 21 of the module 13 and the center of the second side wall 19 of the module 13 and having a lower end 85 coupled to the elongated strap means 67 of the lower securing means 51; and a fourth hanger member 87 having an upper end 89 coupled to the elongated strap means 59 of the upper securing means 49 at a point along the second side wall 19 of the module 13 between the second end wall 23 of the module 13 and the center of the second side wall 19 of the module 13 and having a lower end 91 coupled to the elongated strap means 67 of the lower securing means 51. Each hanger member 69, 75, 81, 87 may consist simply of a loop or ring member or the like constructed out of fabric, plastic, metal, or other substantially strong material having one or two slots or openings therethrough for allowing the strap means 59, 67 to extend therethrough as clearly shown in FIG. 5.

The first upper channel member 53 preferably has a first notch 93 therein at a point along the first side wall member 33 between the first end wall member 37 and the center of the first side wall member 33 for allowing the first hanger member 69 to extend therethrough into the passageway 57 of the first upper channel member 53 and about the elongated strap means 59 of the upper securing means 49. The first upper channel member 53 preferably has a second notch 95 therein at a point along the first side wall member 33 between the second end wall member 39 and the center of the first side wall member 33 for allowing the second hanger member 75 to extend therethrough into the passageway 57 of the first upper channel member 53 and about the elongated strap means 59 of the upper securing means 49. The second upper channel member 55 preferably has a first notch 97 therein at a point along the second side wall member 35 between the first end wall member 37 and the center of the second side wall member 35 for allowing the third hanger member 81 to extend therethrough into the passageway 57 of the second upper channel member 55 and about the elongated strap means 59 of the upper securing means 49. The second upper channel member 55 preferably has a second notch 99 therein at a point along the second side wall member 35 between the second end wall member 39 and the center of the second side wall member 35 for allowing the fourth hanger member 87 to extend therethrough into the passageway 57 of the second upper channel member 55 and about the elongated strap means 59 of the upper securing means 49.

The upper securing means 49 preferably includes upper fastening means 101 for fastening the elongated strap means 59 of the upper securing means 49 about the perimeter of a module 13. The elongated strap means 59 of the upper securing means 49 preferably has a first end 103 and a second end 105 and the upper fastening means 101 is used to adjustably secure the first and second ends 103, 105 of the strap means 59 together as will now be apparent to those skilled in the art. The specific construction and operation of the upper fastening means 101 may vary as will now be apparent to those skilled in the art. Thus, for example, the upper fastening means 101 may consist of various buckles and the like, may merely consist of a knot tying the ends 103, 105 together, etc. The upper fastening means 101 preferably includes a first ring means 107 attached to the first end 103 of the elongated strap means 59 of the upper securing means 49, a second ring means 109 attached to the second end 105 of the elongated strap means 59 of the upper strap means 49, and tongue means 111 having a first end 113 for being attached to the first end 103 of the elongated strap means 59 of the upper securing means 49 and having a second end 115 for extending first through the second ring means 109 of the upper fastening means 101 and then through the first ring means 107 of the upper fastening means 101 for causing the first and second ends 103, 105 of the elongated strap means 59 of the upper securing means 49 to be simultaneously pulled in opposite directions toward one another as indicated by the arrows 117 in FIG. 9 when the tongue means 111 of the upper fastening means 101 is pulled in one direction as indicated by the arrow 119 in FIG. 9.

The lower securing means 51 preferably includes lower fastening means 121 for fastening the elongated strap means 67 of the lower securing means 51 about the perimeter of the module 13. The elongated strap means 67 of the lower securing means 51 preferably has a first end 123 and a second end 125 and the lower fastening means 121 is used to adjustably secure the first and second ends 123, 125 of the strap means 67 together as will now be apparent to those skilled in the art. The specific construction and operation of the lower fastening means 121 may vary as will now be apparent to those skilled in the art. The lower fastening means 121 is preferably identical in structure and operation to the upper fastening means 101 and reference should be made to the above description of the upper fastening means 101 for a full and complete understanding of the preferred construction of the lower fastening means 121.

As thus constructed, the cover 28 can be used with a typical module 13 to protect at least a portion of the module 13 from wind, rain, etc. More specifically, the cap 29 can be merely placed over the top 15 of the module 13 with the first side wall member 33 covering the upper portion of the first side wall 17, with the second side wall member 35 covering the upper portion of the second side wall 19, with the first end wall member 37 covering the upper and mid portions of the first end wall 21, and with the second end wall member 39 covering the upper and mid portions of the second end wall 23. The upper and lower securing means 49, 51 can then be tightened about the perimeter of the module 13 to secure the cap 29 over the top 15 of the module 13 as will now be apparent to those skilled in the art.

A second preferred embodiment of the module cover of the present invention is shown in FIGS. 12–15 and identified by the numeral 2.28. The cover 2.28 is also for use with a typical module 13 to protect at least a portion of the module 13 from wind, rain, etc. Many components and means of the cover 2.28 are similar or identical to corresponding components and means of the cover 11 and such components and means will be identified by an identical numeral with the addition of the preface "2." and reference should be made to the above description of the cover 28 for a more detailed description of such components and means.

The cover 2.28 includes a cap 2.29 for covering the top 15 of the module 13. The cap 2.29 preferably includes a top member 2.31 for covering the top 15 of the module 13, a first side wall member 2.33 attached to the top member 2.31 and depending downwardly from the top member 2.31 for covering at least a portion of the first side wall 17 of the module 13, a second side wall member 2.35 attached to the top member 2.31 and depending downwardly from the top member 2.31 for covering at least a portion of the second side wall 19 of the module 13, a first end wall member 2.37 attached to the top member 2.31 and depending downwardly from the top member 2.31 for covering at least a portion of the first end wall 21 of the module 13, and a second end wall member 2.39 attached to the top member 2.31 and depending downwardly from the top member 2.31 for covering at least a portion of the second end wall 23 of the module 13. Flaps 2.41 may be attached to the side edges of each end wall member 2.37, 2.39 for extending from the side edges of each end wall member 2.37, 2.39 a short distance around each corner of the module 13 as clearly shown in FIGS. 12 and 13. The cap 2.29 may also be constructed out of a waterproof or water-repellent sheet of canvas, plastic or the like in various sizes and in various manners as will now be apparent to those skilled in the art. Thus, the cap 2.29 may be cut, folded and sewn from one or more flat sheets of water-repellant fabric or material as will now be apparent to those skilled in the art. Alternatively, the side wall members 2.33, 2.35 and end wall members 2.37, 2.39 can be manufactured from non-coated, non-water-repellant fabric or material.

The first side wall member 2.33 preferably includes a first side wall extension panel 2.151 for covering the mid portion of the first side wall 17 of the module 13. The second side wall member 2.35 preferably includes a second side wall extension panel 2.153 for covering the mid portion of the second side wall 19 of the module 13. The first and second side wall extension panels 2.151, 2.153 are preferably constructed out of an air-porous material such as netting or the like, sewn or otherwise fixedly attached to the lower edge of each side wall member 2.33, 2.35.

The cover 2.28 includes securing means for securing the cap 2.29 to the module 13. The securing means preferably includes an upper securing means 2.49 for securing the cap 2.29 to the module 13 at a point slightly below the top 15 of the module 13, and a lower securing means 2.51 for securing the cap 2.29 to the module 13 at a spaced distance below the upper securing means 2.49. The upper securing means 2.49 is preferably attached to at least one of the wall members 2.33, 2.35, 2.37, 2.39 at a point slightly below the top member 2.31. Likewise, the lower securing means 2.51 is preferably attached to at least one of the wall members 2.33, 2.35, 2.37, 2.39 at a spaced distance below the upper securing means 2.49.

The upper securing means 2.49 preferably includes an elongated strap means 2.59 for extending around the wall members 2.33, 2.35, 2.37, 2.39 to encircle a module 13 at a point slightly below the top 15 of the module 13 as will now be apparent to those skilled in the art. The strap means 2.59 preferably includes an elongated first strap member 2.155 sewn or otherwise attached to the first side wall member 2.33 at a point slightly below the top member 2.31, and preferably includes an elongated second strap member 2.157 sewn or otherwise attached to the second side wall member 2.35 at a point slightly below the top member 2.31. Each elongated strap member 2.155, 2.157 may consist of an elongated length of material such as fabric webbing, flat rope, or the like as will now be apparent to those skilled in the art with the mid portion thereof sewn or otherwise fixedly attached to the side wall members 2.33, 2.35 at a point slightly below the top member 2.31 and with the opposite ends thereof capable of extending around the end walls 21, 23 of the module 13, etc., as will now be apparent to those skilled in the art.

The lower securing means 2.51 preferably includes an elongated strap means 2.67 for extending around the wall members 2.33, 2.35, 2.37, 2.39 to encircle a module 13 at a spaced distance below the strap means 2.59 of the upper securing means 2.49. The strap means 2.67 preferably includes an elongated first strap member 2.159 sewn or otherwise fixedly attached to the first side wall member 2.33 at a spaced distance below the first strap member 2.155, and preferably includes an elongated second strap member 2.161 sewn or otherwise fixedly attached to the second side wall member 2.35 at a spaced distance below the second strap member 2.157. Each elongated strap member 2.159, 2.161 may consist of an elongated length of material such as fabric webbing, flat rope, or the like as will now be apparent to those skilled in the art with the mid portion thereof sewn or otherwise fixedly attached to the side wall members 2.33, 2.35 at a spaced distance below the respective strap members 2.155, 2.157 and with the opposite ends thereof capable of extending around the end walls 21, 23 of the module 13, etc., as will now be apparent to those skilled in the art.

The upper securing means 2.49 preferably includes upper fastening means for fastening the elongated strap means 2.59 of the upper securing means 2.49 about the perimeter of a module 13. The upper fastening means preferably includes a first upper fastening means 2.163 for fastening one end of the first strap member 2.155 and one end of the second strap member 2.157 together, and a second upper fastening means 2.165 for fastening the other end of the first strap member 2.155 and the other end of the second strap member 2.157 together. The specific construction and operation of the fastening means 2.163, 2.165 may vary as will now be apparent to those skilled in the art. Thus, for example, the fastening means 2.163, 2.165 may consist of various buckles and the like, may merely consist of a knot tying the respective ends of the strap members 2.155, 2.157 together, etc. The fastening means 2.163, 2.165 are preferably identical in structure and operation to the upper fastening means 101 of the upper securing means 49 of the cover 28 and reference should be made to the above description of the upper fastening means 101 for a full and complete understanding of the preferred construction of the fastening means 2.163, 2.165.

The lower securing means 2.51 preferably includes lower fastening means for fastening the elongated strap means 2.67 of the lower securing means 2.51 about the perimeter of a module 13. The lower fastening means preferably includes a first lower fastening means 2.167 for fastening one end of the first strap member 2.159 and one end of the second strap member 2.1617 together, and a second lower fastening means 2.169 for fastening the other end of the first strap member 2.159 and the other end of the second strap member 2.161 together. The specific construction and operation of the fastening means 2.167, 2.169 may vary as will now be apparent to those skilled in the art. Thus, for example, the fastening means 2.167, 2.169 may consist of various buckles and the like, may merely consist of a knot tying the respective ends of the strap members 2.159, 2.161 together, etc. The fastening means 2.167, 2.169 are preferably identical in structure and operation to the upper fastening means 101 of the upper securing means 49 of the cover 28 and reference should be made to the above description of the upper fastening means 101 for a full and complete understanding of the preferred construction of the fastening means 2.167, 2.169.

Figure 27:
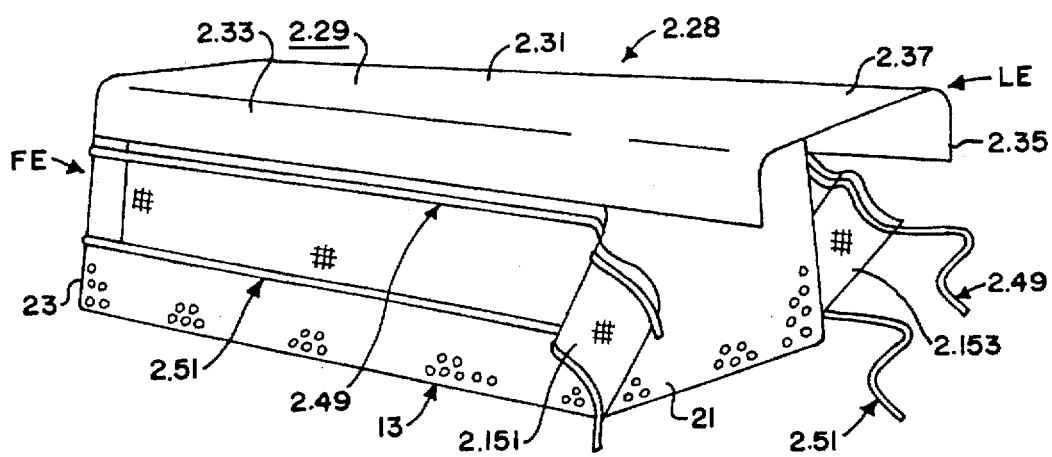
FIGS. 27–29 are perspective views of a modified second embodiment of the module cover of the present invention similar to FIG. 12 but showing the steps of placing the module cover over the module and folding one end of the module cover around one end of the module.
Figure 28:
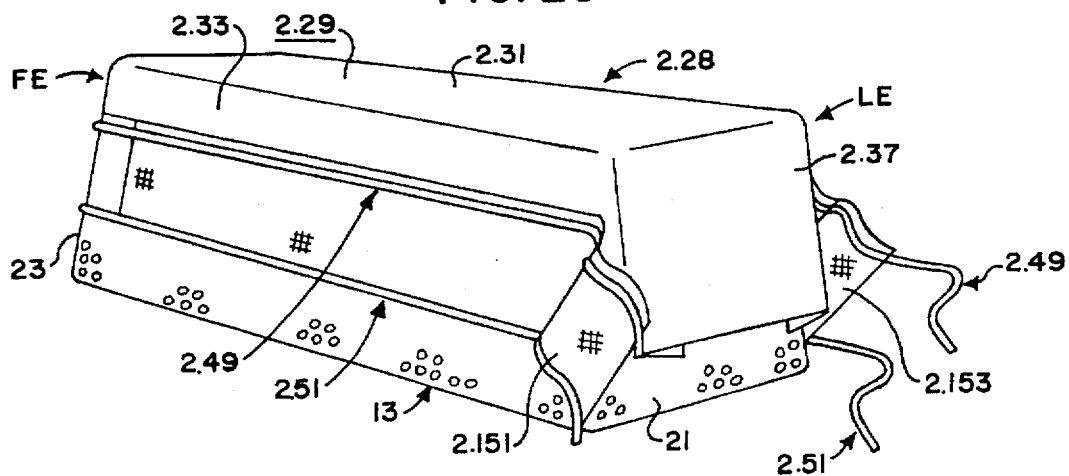
Figure 29:
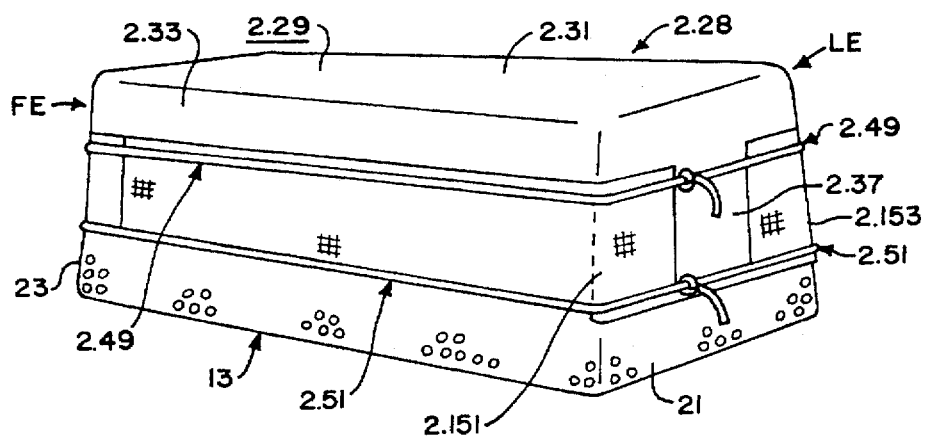

As thus constructed, the cover 2.28 can be used with a typical module 13 to protect at least a portion of the module 13 from wind, rain, etc. More specifically, the cap 2.29 can be merely placed over the top 15 of the module 13 with the first side wall member 2.33 coveting the upper and mid portions of the first side wall 17, with the second side wall member 2.35 covering the upper and mid portions of the second side wall 19, with the first end wall member 2.37 coveting the upper and mid portions of the first end wall 21, and with the second end wall member 2.39 coveting the upper and mid portions of the second end wall 23. At least one end of the cap 2.29 (e.g., the second end wall member 2.39 and associated flaps 2.41) is preferably sewn or otherwise fixedly constructed in the boxlike shape (e.g., with the second end wall member 2.39 and associated flaps 2.41 folded and sewn or otherwise fixedly attached to the side wall members 2.33, 2.35 along the fold 2.171 as shown in FIGS. 12 and 13) similar to a fitted bed sheet while the other end (e.g., the first end wall member 2.37 and associated flaps 2.41) is preferably loose or flat to allow the user to fold the that end around the respective end of the module 13 in a manner similar to a flat bed sheet after the "fitted" end has been placed over its associated end of the module 13 as clearly shown in FIGS. 27–29 and as will now be apparent to those skilled in the art. Thus, FIG. 27 shows the "fitted end" FE of the cover 2.28 fitted onto the second end wall 23 of the cotton module 13 with the "loose end" LE of the cover 2.28 fully "opened." FIG. 28 is similar to FIG. 27 but shows the side edges of the first end wall member 2.37 folded inward with the first end wall member 2.37 then further folded over the upper portion of the first end wall 21 of the cotton module 13. FIG. 29 is similar to FIG. 28 but shows the first ends of the side wall extension panels 2.151, 2.153 of the first and second side wall members 2.33, 2.35 extended and folded over the first end wall member 2.37 and the upper sides of the first end wall 21 of the cotton module 13 with the upper and lower securing means 2.49, 2.51 tightened about the perimeter of the module 13 to secure the cap 2.29 over the top 15 of the module 13 as will now be apparent to those skilled in the art.

A third preferred embodiment of the module cover of the present invention is shown in FIGS. 16–23 and identified by the numeral 3.28. The cover 3.28 is also used in combination with a typical module 13 to protect at least a portion of the module 13 from wind, rain, etc. Many components and means of the cover 3.28 are similar or identical to corresponding components and means of the cover 11 and such components and means will be identified by an identical numeral with the addition of the preface "3." and reference should be made to the above description of the cover 28 for a more detailed description of such components and means.

The cover 3.28 includes a cap 3.29 for being positioned over the top 15 of the module 13. The cap 3.29 preferably includes a top member 3.31 for covering the top 15 of the module 13, a first side wall member 3.33 attached to the top member 3.31 and depending downwardly from the top member 3.31 for covering at least a portion of the first side wall 17 of the module 13, a second side wall member 3.35 attached to the top member 3.31 and depending downwardly from the top member 3.31 for covering at least a portion of the second side wall 19 of the module 13, a first end wall member 3.37 attached to the top member 3.31 and depending downwardly from the top member 3.31 for covering at least a portion of the first end wall 21 of the module 13, and a second end wall member 3.39 attached to the top member 3.31 and depending downwardly from the top member 3.31 for covering at least a portion of the second end wall 23 of the module 13. Each end wall member 3.37, 3.39 is preferably of a length to extend down from the top 15 of the module 13 a distance of approximately four fifths or so of the height of the module 13 when the cap 3.29 is positioned on the module 13. Each side wall member 3.33, 3.35 preferably has a midportion 3.301 that extends down from the top 15 of the module 13 a distance of approximately one fifth or so of the height of the respective side wall 17, 19 of the module 13 when the cap 3.29 is positioned on the module 13, and triangular-shaped end portions 3.303 which extend between the midportion 3.301 and the respective end wall member 3.37, 3.39 as shown in FIGS. 16 and 19. The cap 3.29 may also be constructed out of a waterproof or water-repellent sheet of canvas, plastic or the like in various sizes and in various manners as will now be apparent to those skilled in the art. Thus, the cap 3.29 may be cut, folded and sewn from one or more flat sheets of water-repellant fabric or material as will now be apparent to those skilled in the art. Alternatively, the side wall members 3.33, 3.35 and end wall members 3.37, 3.39 can be manufactured from non-coated, non-water-repellant fabric or material.

The cover 3.28 includes a first hanger member 3.69 secured to the first side wall member 3.33 of the cap 3.29 at a point slightly below the top member 3.31 of the cap 3.29; a second hanger member 3.75 secured to the first side wall member 3.33 of the cap 3.29 at a point slightly below the top member 3.31 of the cap 3.29 and spaced from the first hanger member 3.69; a third hanger member 3.81 secured to the second side wall member 3.35 of the cap 3.29 at a point slightly below the top member 3.31 of the cap 3.29; and a fourth hanger member 3.87 secured to the second side wall member 3.35 of the cap 3.29 at a point slightly below the top member 3.31 of the cap 3.29 and spaced from the third hanger member 3.81.

Figure 21:
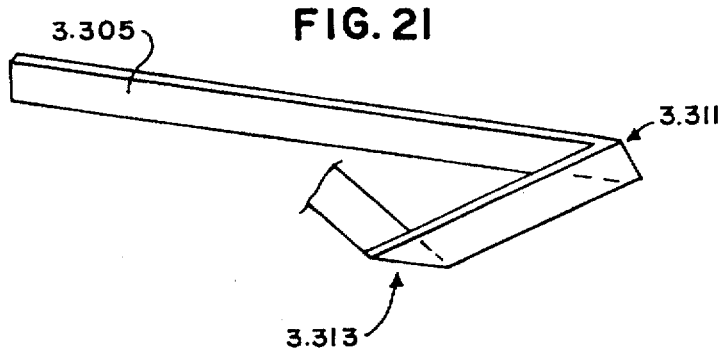
FIG. 21 is a somewhat diagrammatic perspective view of an upper strap of the third embodiment of the module cover of the present invention similar to FIG. 20 but further showing a second fold of a first hanger member thereof.
Figure 22:
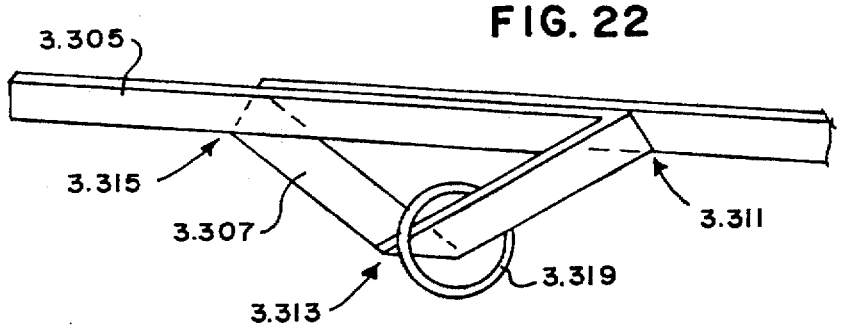
FIG. 22 is a somewhat diagrammatic perspective view of an upper strap of the third embodiment of the module cover of the present invention similar to FIG. 21 but further showing a third fold of a first hanger member thereof.
Figure 23:
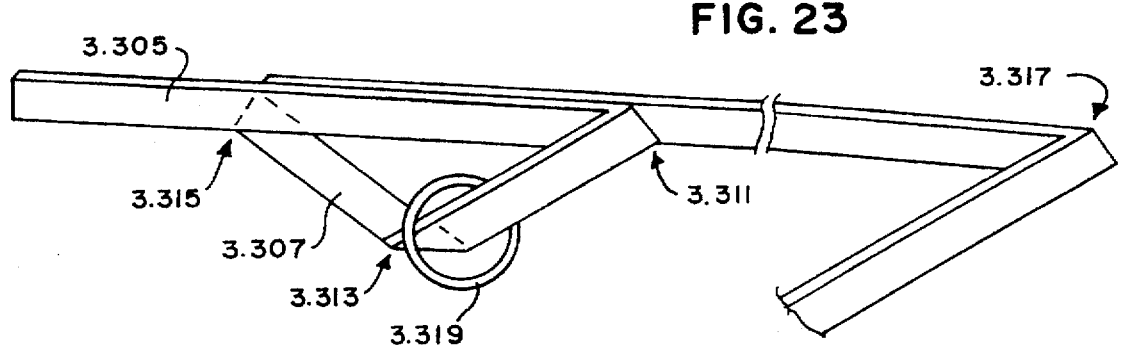
FIG. 23 is a somewhat diagrammatic perspective view of an upper strap of the third embodiment of the module cover of the present invention similar to FIG. 22 but further showing a first fold of a second hanger member thereof.

The first and second hanger members 3.69, 3.75 are preferably constructed from a single elongated length of material 3.305 such as fabric webbing, flat rope, or the like or the like, folded or turned in such a manner to form two spaced apart loops 3.307 as clearly illustrated in FIGS. 20–23 and secured by stitches 3.309 (see FIG. 18), glue, welds, etc., to the first side wall member 3.33 in a position so that each hanger member 3.69, 3.75 is positioned substantially adjacent the bottom edge of the midportion 3.301 of the first side wall member 3.33 and with each hanger member 3.69, 3.75 substantially evenly spaced about the center of the first side wall member 3.33 as clearly shown in FIG. 16. For example, to form the loops 3.307 from the elongated length of material 3.305, the material 3.305 can be first folded as shown in FIG. 20 to form a first bend 3.311, then folded as shown as shown in FIG. 21 to form a second bend 3.313, then folded as shown in FIG. 22 to form a third bend 3.315 thereby completing a first loop 3.307. A second loop 3.307 may be constructed in the same manner. That is, after the third bend 3.315 is completed as above described, the material 3.305 can then be folded as shown in FIG. 23 to form a fourth bend 3.317 a spaced distance from the first bend 3.311 to thereby start the second loop 3.307 as will now be apparent to those skilled in the art. The second loop 3.307 can be completed in the same manner discussed hereinabove relative to the first loop 3.307. The folded assembly can then be secured to the first side wall member 3.33 by stitches 3.309 or the like so that the various bends will be fixed in place, etc. The third and fourth hanger members 3.81, 3.87 are preferably constructed as a mirror image of the first and second hanger members 3.69, 3.75 to form loops 3.307 and secured to the second side wall member 3.35 in a corresponding manner and position as clearly shown in FIG. 19. Each hanger member 3.69, 3.75, 3.81, 3.87 may further include a rigid ring member 3.319 secured within the respective loop 3.307 to reinforce the loops 3.307, etc. The ring members 3.319 may be typical, one-piece metal rings and may be secured to the loops 3.307 when the loops 3.307 are formed by inserting the length of material 3.305 through a respective ring member 3.319 as the length of material 3.305 is being folded to form the spaced apart loops 3.307 as will now be apparent to those skilled in the art.

The cover 3.28 includes strap means 3.67 extending through the first and second hanger members 3.69, 3.75 (i.e., through the ring members 3.319 of the first and second hanger members 3.69, 3.75), through the third and fourth hanger members 3.81, 3.87 (i.e., through the ring members 3.319 of the third and fourth hanger members 3.81, 3.87), and around the first and second end wall members 3.37, 3.39 of the cap 3.29 at a spaced distance below the level of the hanger members 3.69, 3.75, 3.81, 3.87 as clearly shown in FIGS. 16, 17 and 19. The strap means 3.67 extends parallel to the top 15 of the module 13 between the first and second hanger members 3.69, 3.75 (see FIG. 16) and between the third and fourth hanger members 3.81, 3.87 (see FIG. 19); along a straight, downwardly angled line between the first hanger member 3.69 and the first end wall 21 of the module 13 (see FIG. 16); along a straight, downwardly angled line between the second hanger member 3.75 and the second end wall 23 of the module 13 (see FIG. 16); along a straight, downwardly angled line between the third hanger member 3.81 and the second end wall 23 of the module 13 (see FIG. 19); and along a straight, downwardly angled line between the fourth hanger member 3.87 and the first end wall 21 of the module 13 (see FIG. 19).

The lower edge of each triangular shaped end portion 3.303 of the first and second side wall members 3.33, 3.35 of the cap 3.29 and the lower end of the second end wall member 3.39 of the cap 3.29 may be folded to form a tube-like channel 3.321 for receiving the strap means 3.67 (see FIGS. 16, 17 and 19). Alternatively, the strap means 3.67 may be sewn or otherwise directly attached to the lower end of each triangular shaped end portion 3.303 of the first and second side wall members 3.33, 3.35 of the cap 3.29 and the lower end of the second end wall member 3.39 of the cap 3.29. Further, the strap means 3.67 may be loose relative to both the first and second end wall members 3.37, 3.39.

As thus constructed, the cover 3.28 can be used with a typical module 13 to protect at least a portion of the module 13 from wind, rain, etc. More specifically, the cap 3.29 can be merely placed over the top 15 of the module 13 with the first side wall member 3.33 covering the upper portions and a triangular shaped portion at each end of the first side wall 17, with the second side wall member 3.35 covering the upper portions and a triangular shaped portion at each end of the second side wall 19, with the first end wall member 3.37 covering the upper and mid portions of the first end wall 21, and with the second end wall member 3.39 covering the upper and mid portions of the second end wall 23. The opposite ends of the strap means 3.67 can then be pulled around the first end wall member 3.37 of the cap 3.29, tightened about the perimeter of the module 13 to secure the cap 3.29 over the top 15 of the module 13, and fixed to one another by a knot 3.323, buckle or the like (see FIG. 16) to thereby secure the cover 3.28 to the module 13 as will now be apparent to those skilled in the art. Further, the strap means 3.67 may be formed from two separate lengths of material with the opposite ends of each length of material extending about a respective half of the perimeter of the module 13 to secure the cap 3.29 over the top 15 of the module 13, and fixed to one another by a knot, buckle or the like at each end wall member 3.37, 3.39 to thereby secure the cover 3.28 to the module 13.

Figure 24:
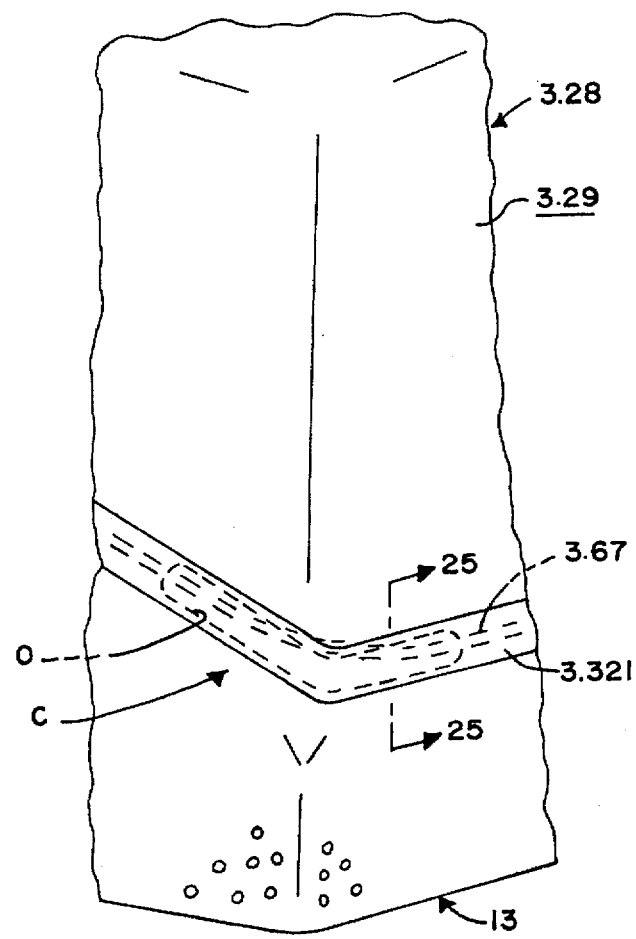
FIG. 24 is a perspective view similar to the front right portion of FIG. 19 but showing an alternate third embodiment of the module cover of the present invention.
Figure 25:
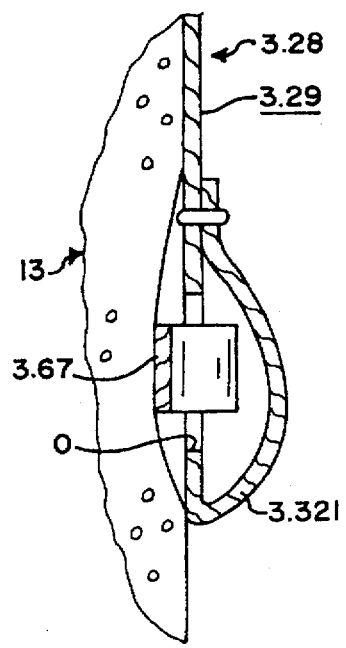
FIG. 25 is a sectional view substantially as taken on line 25—25 of FIG. 24.
Figure 26:
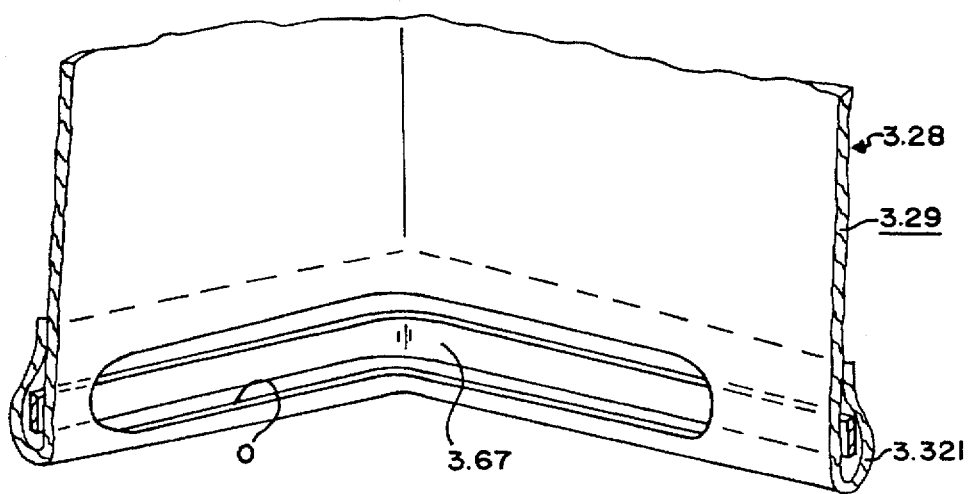
FIG. 26 is a perspective view of a portion of the module cover of FIG. 24 but showing an inside corner thereof.

An alternate corner construction of the tube-like channel 3.321 is shown in FIGS. 24-26. In this construction, a slot or opening O is provided through the inside surface of the tube-like channel 3.321 at the locations where the tube-like channel 3.321 will extend around a corner C of the cotton module 13 as indicated in FIG. 24. The opening O allows a portion of the strap means 3.67 to pull away from the cap 3.29 and bite into a corner of the cotton module 13, while allowing the adjacent portions of the cap 3.29 to hang substantially straight down as shown in FIG. 25 as will now be apparent to those skilled in the art. Such a specific construction provides for better water run-off and the like.

Various alternate constructions of the tube-like channel 3.321 designed to either strengthened or reinforce the tube-like channel 3.321 or to reduce stress and strain applied to the tube-like channel 3.321 by the strap means 3.67 are shown in FIGS. 30-38.

Figure 30:
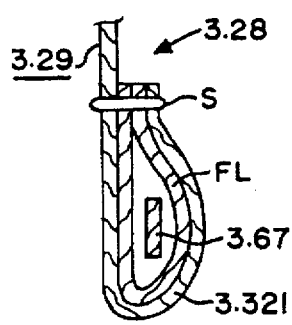
FIGS. 30–38 are sectional views similar to FIG. 17 but showing alternate embodiments of the channel means of the module cover of the present invention.

In the construction shown in FIG. 30, the lower edge of the cap 3.29 is folded to form a tube-like channel 3.321 for receiving the strap means 3.67 and a reinforcing second fabric layer FL is folded inside the tube-like channel 3.321 with securement means S such as stitches, glue, welds, etc., securing the folds so that the channel 3.321 has an effective wall thickness greater than other portions of the cap 3.29 to thereby strengthen and reinforce the tube-like channel 3.321.

Figure 31:
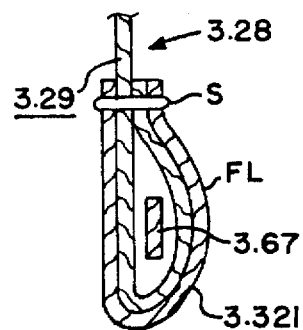

In the construction shown in FIG. 31, the lower edge of the cap 3.29 is also folded to form a tube-like channel 3.321 for receiving the strap means 3.67 but a reinforcing second fabric layer FL is folded about the outside of the tube-like channel 3.321 with securement means S such as stitches, glue, welds, etc., securing the folds so that the channel 3.321 has an effective wall thickness greater than other portions of the cap 3.29 to thereby strengthen and reinforce the tube-like channel 3.321.

Figure 32:
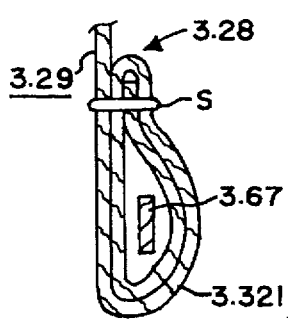

In the construction shown in FIG. 32, the lower edge of the cap 3.29 is folded back on itself three times to form a double thick tube-like channel 3.321 with securement means S such as stitches, glue, welds, etc., securing the folds so that the channel 3.321 has an effective wall thickness greater than other portions of the cap 3.29.

Figure 33:
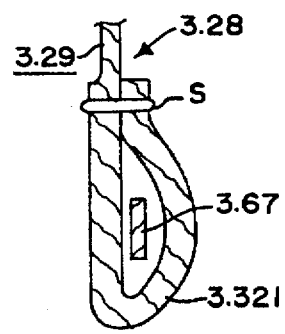

In the construction shown in FIG. 33, the lower edge of the cap 3.29 is made or woven with an increased thickness (e.g., in a double thickness) and then folded back on itself to form a strong, relatively thick tube-like channel 3.321 with securement means S such as stitches, glue, welds, etc., securing the folds so that the channel 3.321 has an effective wall thickness greater than other portions of the cap 3.29.

Figure 34:
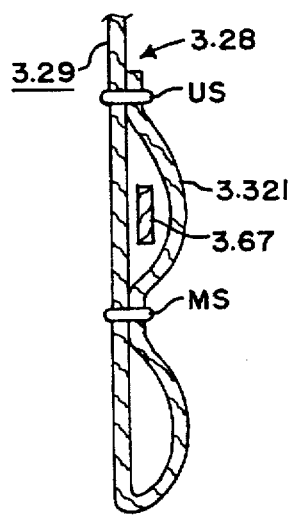

In the construction shown in FIG. 34, the lower edge of the cap 3.29 is folded back on itself with upper securement means US such as stitches, glue, welds, etc., securing the upper end of the fold, and with middle securement means MS such as stitches, glue, welds, etc., securing the middle portion of the fold in such a manner so as to located the tube-like chamber 3.321 a distance above the bottom edge of the cap 3.29 so that the strap means 3.67 will be held a distance above the bottom edge of the cap 3.29 thereby reducing the stress applied to the strap means 3.67 and tube-like chamber 3.321, etc.

Figure 35:
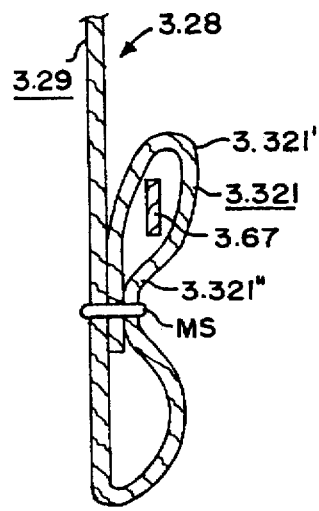

In the construction shown in FIG. 35, a portion of the cap 3.29 is folded back on itself twice with middle securement means MS such as stitches, glue, welds, etc., securing the middle portion of the folds in such a manner so as to located the tube-like chamber 3.321 a distance above the bottom edge of the cap 3.29 so that the strap means 3.67 will be held a distance above the bottom edge of the cap 3.29. The tube-like chamber 3.321 thus has an upper edge 3.321' and a lower edge 3.331" and is attached to the wall members of the cap 3.29 by the lower edge 3.321" thereof (i.e., via the middle securement means MS) so that the tube-like chamber 3.321 is free to pivot or "float" away from the wall members of the cap 3.29 thereby reducing the stress applied to the strap means 3.67 and tube-like chamber 3.321, etc. In this construction, the second or upper fold is folded in a direction inward relative to the first or lower fold.

Figure 36:
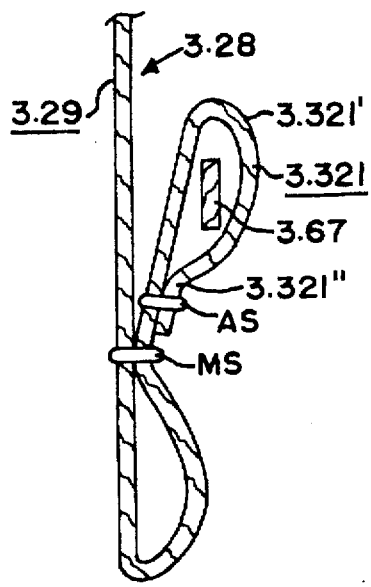

In the construction shown in FIG. 36, a portion of the cap 3.29 is folded back on itself twice with middle securement means MS such as stitches, glue, welds, etc., securing the middle portion of the first fold and with an auxiliary securement means AS such as stitches, glue, welds, etc., securing the second fold in such a manner so as to located the tube-like chamber 3.321 a distance above the bottom edge of the cap 3.29 so that the strap means 3.67 will be held a distance above the bottom edge of the cap 3.29. The tube-like chamber 3.321 thus has an upper edge 3.321' and a lower edge 3.331" and is attached to the wall members of the cap 3.29 by the lower edge 3.321" thereof (i.e., via the middle securement means MS) so that the tube-like chamber 3.321 is free to pivot or "float" away from the wall members of the cap 3.29 thereby reducing the stress applied to the strap means 3.67 and tube-like chamber 3.321, etc. In this construction, the second or upper fold is folded in a direction outward relative the first or lower fold.

Figure 37:
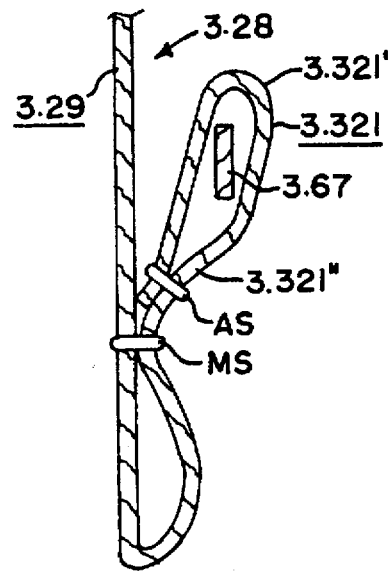

In the construction shown in FIG. 37, a portion of the cap 3.29 is folded back on itself twice with middle securement means MS such as stitches, glue, welds, etc., securing the middle portion of the first fold and with an auxiliary securement means AS such as stitches, glue, welds, etc., securing the second fold in such a manner so as to located the tube-like chamber 3.321 a distance above the bottom edge of the cap 3.29 so that the strap means 3.67 will be held a distance above the bottom edge of the cap 3.29. The tube-like chamber 3.321 thus has an upper edge 3.321' and a lower edge 3.331" and is attached to the wall members of the cap 3.29 by the lower edge 3.321" thereof (i.e., via the middle securement means MS) so that the tube-like chamber 3.321 is free to pivot or "float" away from the wall members of the cap 3.29 thereby reducing the stress applied to the strap means 3.67 and tube-like chamber 3.321, etc. In this construction, the second or upper fold is folded in a direction inward relative to the first or lower fold.

Figure 38:
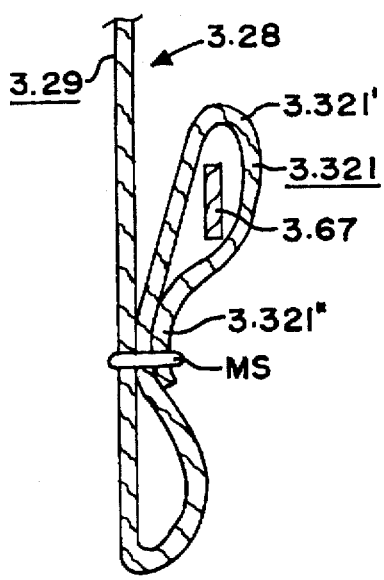

In the construction shown in FIG. 38, a portion of the cap 3.29 is folded back on itself twice with middle securement means MS such as stitches, glue, welds, etc., securing the middle portion of both folds in such a manner so as to located the tube-like chamber 3.321 a distance above the bottom edge of the cap 3.29 so that the strap means 3.67 will be held a distance above the bottom edge of the cap 3.29. The tube-like chamber 3.321 thus has an upper edge 3.321' and a lower edge 3.331" and is attached to the wall members of the cap 3.29 by the lower edge 3.321" thereof (i.e., via the middle securement means MS) so that the tube-like chamber 3.321 is free to pivot or "float" away from the wall members of the cap 3.29 thereby reducing the stress applied to the strap means 3.67 and tube-like chamber 3.321, etc. In this construction, the second or upper fold is folded in a direction outward relative to the first or lower fold.

Although the present invention has been described and illustrated with respect to preferred embodiments and a preferred use therefor, it is not to be so limited since modifications and changes can be made therein which are within the full intended scope of the invention.

I claim:
1. In combination:
   (a) a compressed self-supporting module of fibrous material having a top, elongated first and second side walls, and first and second end walls; and
   (b) a cover comprising:
      (i) a cap including a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module;
      (ii) first strap means secured to the cap at a point slightly below the top member of the cap and extending completely around the module lengthwise and parallel to the top of the module; and
      (iii) a second strap means secured to the cap at a point below the first strap means and extending completely around the module lengthwise and parallel to the top of the module;
   the second end wall member of the cap is fixed to the first and second side wall members of the cap to form a boxlike shape placed over at least a portion of the second end of the cotton module; and
   the first end wall member of the cap is free from the first and second side wall members and folded around at least a portion of the first end of the cotton module.
2. In combination:
   (a) a compressed self-supporting module of fibrous material having a top, elongated first and second side walls, and first and second end walls; and
   (b) a cover comprising:
      (i) a cap including a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module;

(ii) first strap means secured to the cap at a point slightly below the top member of the cap and extending completely around the module lengthwise and parallel to the top of the module; and (iii) a second strap means secured to the cap at a point below the first strap means and extending completely around the module lengthwise and parallel to the top of the module;

the cap including channel means having a passageway therethrough for receiving one of the strap means; the channel means having an upper edge and a lower edge and being attached to at least a portion of one of the wall members of the cap by the lower edge thereof so that the channel means is free to pivot away from the wall members of the cap.

3. In combination:

(a) a compressed self-supporting module of fibrous material having a top, elongated first and second side walls, and first and second end walls; and (b) a cover comprising:

(i) a cap including a top member covering the top of the module, a first side wall member attached to the top member and depending downwardly from the top member and covering at least a part of the upper portion of the first side wall of the module, a second side wall member attached to the top member and depending downwardly from the top member and covering at least a part of the upper portion of the second side wall of the module, a first end wall member attached to the top member and depending downwardly from the top member and covering at least a part of the upper portion of the first end wall of the module, and a second end wall member attached to the top member and depending downwardly from the top member and covering at least a part of the upper portion of the second end wall of the module;

(ii) first strap means secured to the cap at a point slightly below the top member of the cap and extending completely around the module lengthwise and parallel to the top of the module; and (iii) a second strap means secured to the cap at a point below the first strap means and extending completely around the module lengthwise and parallel to the top of the module;

the module having corners between the side and end walls thereof;

the cap including channel means having a passageway therethrough for receiving one of the strap means;

the channel means having an inside surface for engaging a portion of the walls of the module; and the channel means having an opening provided through the inside surface thereof at a location where the channel means extends around a corner of the module for allowing a portion of the strap means received in the channel means to pull away from the cap and bite into the corner of the module.

* * * * *